US011118021B2

(12) United States Patent
Lee et al.

(10) Patent No.: US 11,118,021 B2
(45) Date of Patent: Sep. 14, 2021

(54) FIBER-REINFORCED POLYPROPYLENE-BASED COMPOSITE RESIN COMPOSITION WITH REDUCED ODOR FOR INTERIOR PARTS OF AUTOMOBILES

(71) Applicants: Hyundai Motor Company, Seoul (KR); Kia Motors Corporation, Seoul (KR); GS CALTEX, Seoul (KR)

(72) Inventors: Han Ki Lee, Seoul (KR); Ju Seong Park, Gyeonggi-do (KR); Jae Min Kim, Daejeon (KR); Byung Soo Kim, Daejeon (KR); Byung Wook Kang, Sejong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 140 days.

(21) Appl. No.: 16/392,254

(22) Filed: Apr. 23, 2019

(65) Prior Publication Data
US 2020/0087470 A1  Mar. 19, 2020

(30) Foreign Application Priority Data
Sep. 13, 2018  (KR) ........................ 10-2018-0109778

(51) Int. Cl.
*C08J 5/04* (2006.01)
*C08L 23/00* (2006.01)
*C08L 25/06* (2006.01)

(52) U.S. Cl.
CPC .............. *C08J 5/043* (2013.01); *C08L 23/00* (2013.01); *C08L 25/06* (2013.01); *C08J 2325/06* (2013.01); *C08J 2423/12* (2013.01); *C08J 2423/16* (2013.01); *C08L 2201/08* (2013.01); *C08L 2205/025* (2013.01); *C08L 2205/03* (2013.01); *C08L 2207/04* (2013.01)

(58) Field of Classification Search
CPC .............. C08J 5/04; C08L 23/00; C08L 25/06

USPC ......................................................... 524/443
See application file for complete search history.

(56) References Cited

U.S. PATENT DOCUMENTS

| 6,642,312 B2 * | 11/2003 | Park ........................ C08L 23/04 524/425 |
| 2012/0115386 A1 * | 5/2012 | Jeong ..................... D04H 1/413 442/340 |
| 2012/0157631 A1 * | 6/2012 | Tsou ........................ C08J 5/047 525/98 |
| 2014/0187694 A1 * | 7/2014 | Jang ........................ C08L 23/12 524/210 |

FOREIGN PATENT DOCUMENTS

| KR | 10-0724288 | 5/2007 | |
| KR | 10-1459951 | 11/2014 | |
| KR | 10-2017-0137807 | 12/2017 | |
| WO | WO-2012132764 A1 * | 10/2012 | ............. C08K 13/02 |
| WO | WO-2018017169 A1 * | 1/2018 | ............... D01F 6/06 |

OTHER PUBLICATIONS

Technical Data sheet for HALS 944, Additives for Polymer (Year: 2008).*

* cited by examiner

*Primary Examiner* — Deve V Hall

(57) ABSTRACT

The present disclosure relates to a fiber-reinforced polypropylene composite resin composition with reduced odor for interior parts of vehicles which includes an inorganic deodorant with excellent effects of reducing odors so as to improve indoor air quality, and includes a mixture of a polypropylene polymer, a thermoplastic elastomer, a fiber-shaped filler, a coupling agent, a slip agent and a UV stabilizer.

Interior parts of vehicles molded from the fiber-reinforced polypropylene composite resin composition according to the present disclosure deodorize unpleasant gas generated during the production process and have excellent mechanical properties, thus providing pleasant environments for drivers.

17 Claims, No Drawings

FIBER-REINFORCED POLYPROPYLENE-BASED COMPOSITE RESIN COMPOSITION WITH REDUCED ODOR FOR INTERIOR PARTS OF AUTOMOBILES

CROSS-REFERENCE TO RELATED APPLICATION

This application claims the benefit of and priority to Korean Patent Application No. 10-2018-0109778, filed on Sep. 13, 2018, the entire contents of which are incorporated herein by reference.

FIELD

The present disclosure relates to a resin composition for interior parts of automobiles and more particularly, a polypropylene composite resin composition with reduced odor.

BACKGROUND

The statements in this section merely provide background information related to the present disclosure and may not constitute prior art.

Polymers are synthesized and prepared using a variety of compounds. The compounds have certain unpleasant odors and products obtained from the polymers have deteriorated quality because the odors of the compounds are maintained. In particular, composite materials, the strength and rigidity of which may be improved using fiber-shaped fillers such as glass fiber, often have such characteristics. The composite materials may benefit from incorporation of a coupling agent to improve interfacial adhesion between fiber-shaped fillers and polymers. Odors emitted during the preparation of the coupling agents have adverse impacts on the composite materials.

Fiber-reinforced composite materials were previously mainly used as exterior materials. However, as disclosed in Korean Patent No. 1459951, fiber-reinforced composite materials are used as interior materials of vehicles and the like, without additional surface-treatment such as coating and sealing and, in this case, we have discovered that fiber-reinforced composite materials with reduced odors may be desired.

Accordingly, attempts to reduce odors are being made through selection of suitable deodorants and appropriate application thereof depending on the type of odors generated during the production of composite materials. Deodorants are broadly classified into physical adsorbent deodorants and chemical adsorbent deodorants depending on realization methods of deodorant effects. The representative example of the physical adsorbent deodorant is activated carbon and an odor-causing material is bound to carbon present on the surface thereof through a porous structure and then remove it in the form of a complex.

As chemical adsorbent deodorants, various inorganic deodorants containing transition metal and alkali metal ions depending on the properties of odor-causing materials are generally used. For example, Korean Patent Laid-open No. 10-2017-0137807 discloses an inorganic deodorant to remove odors of ammonia gas generated from resin molded articles.

The above information disclosed in this Background section is provided only for enhancement of understanding of the background of the disclosure and therefore it may contain information that does not form the prior art that is already known in this country to a person of ordinary skill in the art.

SUMMARY

The present disclosure provides a fiber-reinforced polypropylene composite resin composition that has reduced odors without causing deterioration in mechanical properties such as elongation for interior parts of vehicles.

The present disclosure provides an interior part for vehicles that has reduced odors and thus improved quality.

In one aspect, the present disclosure provides a fiber-reinforced polypropylene composite resin composition including 35 to 50% by weight of a polypropylene polymer, 30 to 40% by weight of a thermoplastic elastomer, 15 to 25% by weight of a fiber-shaped filler, 0.5 to 2% by weight of a coupling agent, and 2 to 4% by weight of an inorganic deodorant.

The fiber-reinforced polypropylene composite resin composition may further include a slip agent and a UV stabilizer.

The polypropylene polymer is any one selected from the group consisting of a propylene homopolymer, a propylene-ethylene copolymer and a combination thereof.

The propylene homopolymer may have a melt flow index of 10 to 25 g/10 min (230° C., 2.16 kg).

The propylene-ethylene copolymer may include a first propylene-ethylene copolymer having a melt flow index of 25 to 35 g/10 min (230° C., 2.16 kg), and a second propylene-ethylene copolymer having a melt flow index of 90 to 100 g/10 min (230° C., 2.16 kg).

The polypropylene polymer may have a weight average molecular weight of 80,000 to 600,000 g/mol and a specific gravity of 0.89 to 0.91.

The thermoplastic elastomer may include an olefin-based thermoplastic elastomer, and a styrene-based thermoplastic elastomer.

The fiber-shaped filler may be any one selected from the group consisting of glass fiber, carbon fiber, steel fiber, aramid fiber, polypropylene fiber, vinylon fiber, nylon and a combination thereof.

The fiber-shaped filler may have a diameter of 10 to 30 μm, and a length of 1 to 12 mm.

The coupling agent may be a modified polypropylene polymer grafted with unsaturated carboxylic acid or a derivative thereof.

The inorganic deodorant may be a silicate compound including a partial structure represented by the following Chemical Formula 1:

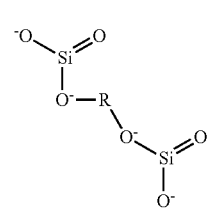

[Chemical Formula 1]

wherein R is a trivalent aluminum cation ($Al^{3+}$), a monovalent silver cation ($Ag^+$), a divalent zinc cation ($Zn^{2+}$) or a monovalent ammonium cation ($NH^{4+}$).

The inorganic deodorant may be a silicate compound represented by the following Compositional Formula 1 and having a layered structure:

   [Compositional Formula 1]

The inorganic deodorant may have a BET surface area of 220 to 280 m²/g.

The slip agent may be any one selected from the group consisting of a saturated fatty acid amide-based slip agent, a silicone-based slip agent and a combination thereof.

The UV stabilizer may be a mixture of: a hindered amine light stabilizer (HALS)-based UV stabilizer having a weight average molecular weight of 2,000 g/mol or more; and any one antioxidant selected from a phenol-based antioxidant, an amine-based antioxidant, a sulfur-based antioxidant, a phosphorus-based antioxidant and a combination thereof.

In another aspect, the present disclosure provides a molded article including the fiber-reinforced polypropylene composite resin composition.

The molded article may have an elongation of 5.0% or more, a high temperature (23° C.) IZOD impact strength of 260 J/m or more and a low temperature (−10° C.) IZOD impact strength of 180 J/m or more, and have an odor grade measured in accordance with MS300-34, of 2.5 or less.

The molded article may be a vehicle interior part.

Other aspects and preferred embodiments of the disclosure are discussed infra.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses.

The disclosure will be clearly understood from the following aspects. However, the present disclosure is not limited to these forms, which are suggested only to offer thorough and complete understanding of the disclosed contents and sufficiently inform those skilled in the art of the technical concept of the present disclosure.

It will be understood that, although the terms first, second, etc. may be used herein to describe various elements, these elements should not be limited by these terms and are used only to distinguish one element from another. For example, within the scope defined by the present disclosure, a first element may be referred to as a second element and similarly, a second element may be referred to as a first element. Singular forms are intended to include plural forms as well, unless context clearly indicates otherwise.

It will be further understood that the terms "comprises", "has" and the like, when used in this specification, specify the presence of stated features, number, steps, operations, elements, components or combinations thereof, but do not preclude the presence or addition of one or more other features, numbers, steps, operations, elements, components, or combinations thereof. In addition, it will be understood that, when an element such as a layer, film, region or substrate is referred to as being "on" another element, it can be directly on the other element or an intervening element may also be present. It will also be understood that, when an element such as a layer, film, region or substrate is referred to as being "under" another element, it can be directly under the other element or an intervening element may also be present.

Unless context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures among other things. For this reason, it should be understood that, in all cases, the term "about" modifies all the numbers, figures and/or expressions. In addition, when numerical ranges are disclosed in the description, these numerical ranges are continuous and include all numbers from the minimum to the maximum including the maximum within the ranges unless otherwise defined. Furthermore, when the range is referred to as an integer, it includes all integers from the minimum to the maximum including the maximum within the range, unless otherwise defined.

It should be understood that, in the specification, when the range is referred to regarding a parameter, the parameter encompasses all figures including end points disclosed within the range. For example, the range of "5 to 10" includes figures of 5, 6, 7, 8, 9, and 10, as well as arbitrary sub-ranges such as ranges of 6 to 10, 7 to 10, 6 to 9, and 7 to 9, and any figures, such as 5.5, 6.5, 7.5, 5.5 to 8.5 and 6.5 to 9, between appropriate integers that fall within the range. In addition, for example, the range of "10% to 30%" encompasses all integers that include figures such as 10%, 11%, 12% and 13%, as well as 30%, and any sub-ranges of 10% to 15%, 12% to 18%, or 20% to 30%, as well as any figures, such as 10.5%, 15.5% and 25.5%, between appropriate integers that fall within the range.

The fiber-reinforced polypropylene composite resin composition according to the present disclosure includes a polypropylene polymer, a thermoplastic elastomer, a fiber-shaped filler, a coupling agent and an inorganic deodorant. The fiber-reinforced polypropylene composite resin composition may further include a slip agent and a UV stabilizer.

Polypropylene Polymer

The polypropylene polymer may be any one selected from a propylene homopolymer, a propylene-ethylene copolymer and a combination thereof, and is preferably a mixture of the propylene homopolymer and the propylene-ethylene copolymer.

The polypropylene polymer may be a mixture of the propylene homopolymer and the propylene-ethylene copolymer in a weight ratio of 1:1 to 1:2. When the weight ratio falls into the range, excellent rigidity and heat resistance of the propylene homopolymer, and excellent impact resistance of the propylene-ethylene copolymer can be complementary.

The propylene homopolymer is preferably a high-crystalline propylene homopolymer having an isotactic index (measured by $^{13}$C-NMR) of 97% or more, and preferably has a melt flow index of 10 to 25 g/10 min (230° C., 2.16 kg). When the melt flow index is lower than 10 g/10 min, molding workability is deteriorated due to decreased flowability and, when the melt flow index is higher than 25 g/10 min, impact strength may be deteriorated.

The propylene-ethylene copolymer may be a mixture of a first propylene-ethylene copolymer having a melt flow index of 25 to 35 g/10 min (230° C., 2.16 kg) and a second propylene-ethylene copolymer having a melt flow index of 90 to 110 g/10 min (230° C., 2.16 kg).

The propylene-ethylene copolymer may be a mixture of the first propylene-ethylene copolymer and the second propylene-ethylene copolymer in a weight ratio of 5:1 to 7:1.

When the weight ratio is less than 5:1, mechanical properties such as rigidity are deteriorated and, when the weight ratio is higher than 7:1, mechanical properties are better, but flowability is poor, which reduce production efficiency and moldability.

The polypropylene polymer preferably has a weight average molecular weight of 80,000 to 600,000 g/mol and a specific gravity of 0.89 to 0.91.

The content of the polypropylene polymer may be 35 to 50% by weight. When the content is less than 35% by weight, reduction of moldability and production efficiency may occur and, when the content is higher than 50% by weight, mechanical properties may be deteriorated.

Thermoplastic Elastomer

The thermoplastic elastomer is an element to improve impact resistance. The thermoplastic elastomer may be a mixture of an olefin-based thermoplastic elastomer and a styrene-based thermoplastic elastomer. The olefin-based thermoplastic elastomer may be applicable to parts having high impact strength due to excellent impact properties thereof, and the styrene-based thermoplastic elastomer can have low hardness due to expandability due to oils. Advantages of the olefin-based thermoplastic elastomer and advantages of the styrene-based thermoplastic elastomer can be complementary.

Specifically, the styrene-based thermoplastic elastomer is added to improve impact strength, while reducing deterioration in rigidity. Ingredients contained in the styrene-based thermoplastic elastomer are preferably thermoplastic elastomers having a linear or non-linear structure, and thermoplastic elastomers wherein preferably 95% or more, more preferably, 97% or more of an unsaturated bond is hydrogenated are used.

The thermoplastic elastomer may be a mixture of the olefin-based thermoplastic elastomer and the styrene-based thermoplastic elastomer in a weight ratio of 3:1 to 5:1. When the weight ratio is less than 3:1, the composition is inapplicable to part materials for vehicles due to increased proportion of the expensive styrene-based thermoplastic elastomer, and when the weight ratio is higher than 5:1, there may be deteriorated rigidity due to low proportion of the styrene-based thermoplastic elastomer.

The content of the thermoplastic elastomer may be 30 to 40% by weight. When the content is less than 30% by weight, impact strength may be deteriorated, and, when the content is higher than 40% by weight, production efficiency and rigidity may be deteriorated.

Fiber-Shaped Filler

The fiber-shaped filler is an element to improve mechanical properties. The fiber-shaped filler may be any one selected from: inorganic fibers such as glass fiber, carbon fiber and steel fiber; organic fibers such as aramid fiber, polypropylene fiber, vinylon fiber, and nylon; and a combination thereof, and is preferably glass fiber.

The glass fiber may be E glass, ECR Glass with improved corrosion resistance, GA glass with acid resistance or the like.

The fiber-shaped filler may have a diameter of 10 to 30 μm, and a length of 1 to 12 mm. When the length is less than 1 mm, fiber single yarns are produced during manufacture of products, and when the length is higher than 12 mm, processability and impregnation property may be deteriorated.

The content of the fiber-shaped filler may be 15 to 25% by weight. When the content is less than 15% by weight, rigidity and heat resistance may be deteriorated and, when the content is higher than 25% by weight, moldability may be deteriorated.

Coupling Agent

The coupling agent is an element to improve interfacial adhesion between the polypropylene polymer and the fiber-shaped filler. The coupling agent may be a modified polypropylene polymer in which a polypropylene polymer is grafted with an unsaturated carboxylic acid such as maleic anhydride or a derivative thereof.

The content of the coupling agent may be 0.5 to 2% by weight. When the content is less than 0.5% by weight, dispersibility may be deteriorated due to lack of interfacial adhesion between the polypropylene polymer and the fiber-shaped filler, which makes it difficult to secure the main property of rigidity, and when the content is higher than 2% by weight, brittleness and increased molding defects may occur.

Inorganic Deodorant

The inorganic deodorant is an element to improve odor. As described above, coupling agents are added to composite resin compositions that provide improved strength and rigidity by incorporating fiber-shaped fillers such as glass fiber in base resins such as polypropylene polymers. In this regard, odors emitted during the process of preparing the coupling agent remain in final products, which may cause deterioration in quality. When conventional physical and chemical adsorbent deodorants are used, deodorant effects can be obtained, mechanical properties for vehicle interior parts are deteriorated. One technical feature of the present disclosure is to overcome the technical limitations of the prior art using the inorganic deodorant which will be described later.

The inorganic deodorant may be a silicate compound including a partial structure represented by the following Chemical Formula 1:

[Chemical Formula 1]

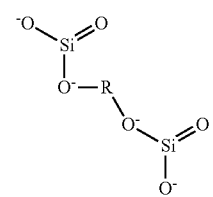

wherein R is a trivalent aluminum cation ($Al^{3+}$), a monovalent silver cation ($Ag^+$), a divalent zinc cation ($Zn^{2+}$) or a monovalent ammonium cation ($NH^{4+}$). The solid line in the Chemical Formula 1 represents a covalent bond and the dotted line represents electrostatic attraction between an anion and a cation.

The expression that a compound "includes a partial structure" used in the specification means that the partial structure is arranged repeatedly to form the compound.

Specifically, the inorganic deodorant may be a silicate compound represented by the following Compositional Formulae 1 and 2.

[Compositional Formula 1]

$Ag_2Al_2H_8N_2O_{21}Si_7Zn_2$

[Chemical Formula 2]

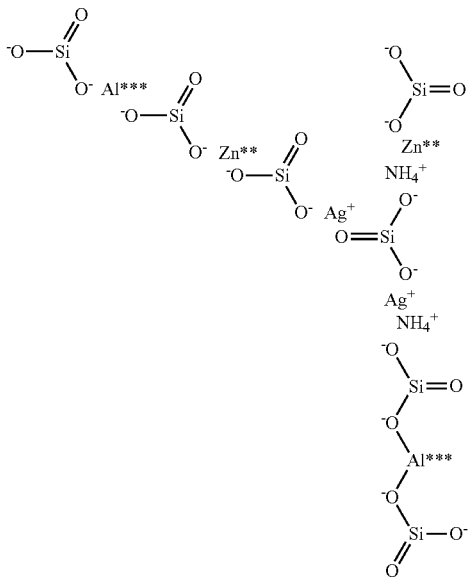

In Chemical Formula 2, electrostatic attraction between the anion and the cation is omitted. Those skilled in the art can appreciate accurate chemical structure of the inorganic deodorant by arrangements of the anion and the cation.

In addition, the inorganic deodorant may be a silicate compound with a layered structure. The layered structure means that silicate spreads two-dimensionally via a cation, as shown in Chemical Formula 2.

Ordinarily used inorganic deodorants have exhibited limitedly deodorant effects only to specific gases such as amines, sulfur, aromatic and acidic gas. In addition, inorganic deodorants including copper compounds and products containing such deodorants turn blue in proportion to deodorant effects because copper is blue.

One technical feature of the present disclosure is to use the aforementioned specific inorganic deodorant, instead of the conventional inorganic deodorant.

The inorganic deodorant according to the present disclosure has a layered structure, and thus easily chemically and physically adsorbs odor-causing materials (gases) and has excellent deodorant rates. In addition, the inorganic deodorant is effective in deodorizing alkaline gas such as ammonia or amine, acidic gas and aromatic gas via three types of metal cations and an ammonium cation constituting a layered structure.

The inorganic deodorant may have a BET specific surface area of 220 to 280 m²/g. The BET specific surface area should fall into the range defined above in order to obtain excellent deodorant effects.

The content of the inorganic deodorant may be 2 to 4% by weight. When the content is less than 2% by weight, it is difficult to obtain the effects of reducing odors from the polypropylene composite resin composition, and when the content is higher than 4% by weight, the scope of mechanical properties for vehicle interior parts is not satisfied due to high content of the deodorant containing inorganic materials.

Slip Agent

The slip agent is an element to provide smooth texture. The slip agent may be any one selected from the group consisting of a saturated fatty acid amide-based slip agent, a silicone-based slip agent and a combination thereof.

The content of the slip agent may be 3% by weight or less. The lower limit of the content of the slip agent is not particularly limited, but is, for example, 0.1% by weight or more. When the content is higher than 3% by weight, the amount of the slip agent that migrates to the product surface increases, which may cause stain and shine, as well as deterioration in physical properties.

UV Stabilizer

The UV stabilizer may be a mixture of a hindered amine light stabilizer (HALS)-based UV stabilizer and a primary antioxidant and/or a secondary antioxidant.

The HALS-based UV stabilizer may have a weight average molecular weight of 2,000 g/mol or more. When the weight average molecular weight is less than 2,000 g/mol, the UV stabilizer is readily released into the product surface and thus may not provide long-term UV stabilization.

The primary antioxidant functions to remove radicals from the polypropylene composite resin composition and may be a phenol-based antioxidant, an amine-based antioxidant or the like.

The secondary antioxidant functions to remove peroxides from the polypropylene composite resin composition and may be a sulfur-based antioxidant, a phosphorus-based antioxidant or the like.

The content of the UV stabilizer may be 1% by weight or less. The lower limit of the content of the UV stabilizer is not particularly limited and is, for example, 0.1% by weight or more. In addition, the content of the UV stabilizer may be 0.1 to 2 parts by weight, when the total content of the polypropylene polymer, the thermoplastic elastomer, the fiber-shaped filler, the coupling agent, the inorganic deodorant and the slip agent is 100 parts by weight. The content should fall into the range defined above in order to reduce appearance issues such as surface stain.

Additive

The polypropylene composite resin composition may further include one or more additives selected from the group consisting of neutralizing agents, nucleating agents, lubricants, release agents, flame retardants, pigments, antistatic agents, antibacterial agents, processing aids, metal deactivators and combinations thereof.

The vehicle interior part molded from the polypropylene composite resin composition according to the present disclosure can maintain excellent mechanical properties and exhibit superior qualities, because specific unpleasant odors produced during the production process are effectively removed, thus providing pleasant environments for drivers.

Hereinafter, the present disclosure will be described in more detail with reference to specific examples. These examples are provided only for illustration to aid in understanding of the present disclosure and should not be construed as limiting the scope of the present disclosure.

Examples and Comparative Examples

Specimens used for Examples and Comparative Examples of the present disclosure were produced by the following process. First, the polypropylene composite resin composition was prepared in accordance with ingredients and compositional ratios shown in the following Table 1 and pellets were produced using a twin screw extruder. Then, specimens of Examples and Comparative Examples for measuring thermal/mechanical properties and odors were produced by injecting at a predetermined injection temperature of 200 to 240° C. in a 250 ton injection molding machine.

TABLE 1

| Composition | | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Polypropylene polymer | Propylene homopolymer [wt %] | 20 | 20 | 20 | 20 | 20 | 20 | 20 | 20 |
| | Propylene-ethylene copolymer [wt %] | 22 | 22 | 22 | 22 | 22 | 22 | 22 | 22 |
| Thermoplastic elastomer [wt %] | | 33 | 32 | 31 | 32 | 35 | 32 | 34 | 30 |
| Fiber-shaped filler[1] [wt %] | | 20 | 20 | 20 | 20 | 20 | 20 | 20 | 20 |
| Coupling agent [wt %] | | 2 | 2 | 2 | 2 | 2 | 2 | 2 | 2 |
| Slip agent [wt %] | | 1 | 1 | 1 | 1 | 1 | 1 | 1 | 1 |
| UV stabilizer [parts by weight[2]] | | 0.5 | 0.5 | 0.5 | 0.5 | 0.5 | 0.5 | 0.5 | 0.5 |
| Organic deodorant [wt %] | | 2 | 3 | 4 | 3 | — | — | 1 | 5 |
| Activated carbon and zinc oxide Titan deodorant[3] [wt %] | | — | — | — | — | — | 3 | — | — |

[1]The fiber-shaped fillers is a glass fiber having a diameter of 10 to 30 μm and a length of 1 to 12 mm.
[2]The content of the UV stabilizer is based on 100 parts by weight, the total content of the polypropylene polymer, the thermoplastic elastomer, the fiber-shaped filler, the coupling agent, the slip agent, the UV stabilizer, and the inorganic deodorant.
[3]The activated carbon and zinc dioxide titan deodorant is a mixture (in a weight ratio of 20:1) of activated carbon disclosed in Korean Patent No. 724,288 and "TZ-100", which is a mixture of titanium dioxide and zonc oxide commercially available from Titan industries Co., Ltd.

Example 1

A specimen for measuring physical properties was produced in accordance with the ingredients and compositional ratios shown in Table 1 and the inorganic deodorant according to the present disclosure was used in an amount of 2% by weight.

Example 2

A specimen for measuring physical properties was produced in the same manner as in Example 1, except that the content of the inorganic deodorant was increased to 3% by weight and the content of the thermoplastic elastomer was decreased by 1% by weight.

Example 3

A specimen for measuring physical properties was produced in the same manner as in Example 1, except that the content of the inorganic deodorant was increased to 4% by weight and the content of the thermoplastic elastomer was decreased by 2% by weight.

Example 4

The final composition was the same as in Example 2, except that the content of the inorganic deodorant was decreased to 3% by weight and the content of the thermoplastic elastomer was decreased by 1% by weight. However, first, the fiber-shaped filler, the coupling agent and the inorganic deodorant were produced in the form of a master batch and then the master batch was re-extruded and diluted to produce specimens for measuring physical properties.

Comparative Example 1

A specimen for measuring physical properties was produced in the same manner as in Example 1, except that the inorganic deodorant was removed and the content of the thermoplastic elastomer was increased by 2% by weight.

Comparative Example 2

A specimen for measuring physical properties was produced in the same manner as in Example 1, except that the activated carbon/zinc oxide titanium deodorant was used instead of the inorganic deodorant and the content thereof was controlled to 3% by weight to reduce the content of the thermoplastic elastomer.

Comparative Example 3

A specimen for measuring physical properties was produced in the same manner as in Example 1, except that the content of the inorganic deodorant was decreased to 1% by weight and the content of the thermoplastic elastomer was increased to 1% by weight.

Comparative Example 4

A specimen for measuring physical properties was produced in the same manner as in Example 1, except that the content of the inorganic deodorant was increased to 5% by weight and the content of the thermoplastic elastomer was decreased by 3% by weight.

Experimental Example

Results of measurement of physical properties shown in the following Table 2 are represented by averages of values, excluding the maximum and the minimum, of 10 values obtained by measuring 10 specimens of Examples and Comparative Examples and the test method associated therewith is as follows.

(1) Measurement of specific gravity: the center of the specimen for measuring flexural strength was measured in accordance with ASTM D792.

(2) Measurement of tensile strength and elongation: measured at a load application rate of 50 mm/min in accordance with ASTM D638. The elongation was measured based on failure point.

(3) Measurement of flexural modulus and flexural strength: measured at a load application rate of 10 mm/min in accordance with ASTM D790.

(4) Measurement of IZOD impact strength: measured at a high temperature (23° C.) and −10° C. with a Notched specimen in accordance with ASTM D256.

(5) Measurement of heat distortion temperature: measured at a load of 4.6 kgf in accordance with ASTM D648.

(6) Measurement of Shore hardness: measured based on D-scale in accordance with ASTM D2240.

(7) Measurement of odor: measured in accordance with MS300-34 (set conditions: dry condition, heating temperature (80±2)° C.). Specifically, an insulating specimen, which was produced from the polypropylene composite resin composition and had a length of 10 cm and a weight of 2.57 g, was heated in a sealed 4 L container at 80±2° C. for 2 hours in accordance with dry conditions of MS300-34, the cover of the container was opened, and three or more subjects took the smell and determined the grade of the smell. Grade 6 means an odor which is so strong as to feel difficulty in breathing and is thus unbearable, grade 5 means a very strong odor, grade 4 means an easily detectable odor, grade 3 means an odor which is weak, but is detectable, grade 2 means an odor which is impossible to recognize what it is, but is detectable, and grade 1 means inodorousness.

Example 4 showed remarkable decreases in physical properties such as elongation, and high temperature and low temperature IZDO impact strength. This means that the deodorant with a predetermined content or may not yield reduction of odor and acquirement of physical properties.

In addition, when a small amount of deodorant was added, the deodorant effects of the resin composition were reduced, most physical properties were satisfied, but standards for odors were not satisfied, as can be seen from Comparative Example 3. Although the same content of deodorant was added, like Example 4, when the fiber-shaped filler, the coupling agent and the deodorant were first master-batched to improve dispersibility and miscibility, the effects of improving odors could be increased.

In addition, the conventional deodorant used for Comparative Example 2, i.e., a mixture of activated carbon and TZ-100, satisfied physical property values similar to the standards, but did not satisfy standards for odor evaluation items, which means that the conventional deodorant, i.e., the mixture of the activated carbon and TZ-100, could not satisfy both physical properties and effects of reducing odors.

TABLE 2

| Items | Example 1 | Example 2 | Example 3 | Example 4 | Comparative Example 1 | Comparative Example 2 | Comparative Example 3 | Comparative Example 4 |
|---|---|---|---|---|---|---|---|---|
| Specific gravity [g/cm$^3$] | 1.02 | 1.03 | 1.04 | 1.03 | 1.01 | 1.07 | 1.01 | 1.10 |
| Tensile strength [MPa] | 23 | 24 | 25 | 24 | 21 | 22 | 22 | 29 |
| Elongation [%] | 5.7 | 5.4 | 5.1 | 5.4 | 6.9 | 5.5 | 6 | 3.3 |
| Flexural modulus [MPa] | 1,810 | 1,815 | 1,819 | 1,815 | 1,802 | 1,814 | 1,803 | 1,853 |
| Flexural strength [MPa] | 29 | 30 | 31 | 30 | 27 | 28 | 28 | 38 |
| High temperature IZOD impact strength [J/m] | 266 | 264 | 264 | 265 | 269 | 260 | 268 | 181 |
| Low temperature IZOD impact strength [J/m] | 185 | 183 | 183 | 185 | 187 | 180 | 186 | 131 |
| HDT (4.6 kgf) [° C.] | 130 | 131 | 131 | 131 | 130 | 132 | 130 | 131 |
| Shore hardness | 41 | 43 | 44 | 43 | 40 | 45 | 40 | 49 |
| Odor [Grade] | 3.0 | 3.0 | 2.5 | 2.5 | 4 | 3.7 | 3.5 | 2.5 |

As can be seen from Table 2 above, the resin composition of Example including the inorganic deodorant exhibits better physical properties and remarkably improved odor evaluation items, as compared to the resin composition of Comparative Example.

The inorganic deodorant according to the present disclosure has higher specific gravity than other ingredients constituting the resin composition, because it is an inorganic material. When it comes to mechanical properties, in Examples 1 to 3, as the content of the inorganic deodorant in the composite resin increases, specific gravity, tensile strength, flexural modulus, flexural strength and hardness increase, whereas elongation and IZOD impact strength decrease.

In addition, when it comes to deodorant performance, as the content of the inorganic deodorant increases, odors applicable to the evaluation of deodorant performance are decreased, which means that deodorant effects are increased.

However, when comparing Example 3 with Comparative Example 4, although the deodorant content of Comparative Example 4 was increased by 1% by weight, results of odor measurement showed that Example 3 and Comparative Example 4 had an identical grade of 2.5 and Comparative By using the fiber-reinforced polypropylene composite resin composition according to the present disclosure, interior parts for vehicles that have excellent mechanical properties, are free of odors derived from volatile organic compounds (VOCs) or the like, and exhibit excellent appearance and texture can be obtained.

The effects of the present disclosure are not limited to those described above. It should be understood that the effects of the present disclosure include all effects that can be inferred from the description above.

The disclosure has been described in detail. However, it will be appreciated by those skilled in the art that changes may be made without departing from the principles and spirit of the disclosure.

What is claimed is:

1. A fiber-reinforced polypropylene composite resin composition comprising:
   35 to 50% by weight of a polypropylene polymer based on 100% by weight of a polypropylene composite resin composition;
   30 to 40% by weight of a thermoplastic elastomer based on 100% by weight of a polypropylene composite resin composition;

15 to 25% by weight of a fiber-shaped filler based on 100% by weight of a polypropylene composite resin composition;

0.5 to 2% by weight of a coupling agent based on 100% by weight of a polypropylene composite resin composition; and 2 to 4% by weight of an inorganic deodorant based on 100% by weight of a polypropylene composite resin composition, wherein the inorganic deodorant is a silicate compound including a partial structure represented by Chemical Formula 1:

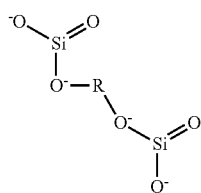

[Chemical Formula 1]

wherein R is a trivalent aluminum cation ($Al^{3+}$), a monovalent silver cation ($Ag^{3+}$), a divalent zinc cation ($Zn^{2+}$), or a monovalent ammonium cation ($NH^{4+}$).

2. The fiber-reinforced polypropylene composite resin composition according to claim 1, further comprising:
a slip agent; and
a UV stabilizer.

3. The fiber-reinforced polypropylene composite resin composition according to claim 1, wherein the polypropylene polymer is selected from the group consisting of a propylene homopolymer, a propylene-ethylene copolymer or mixtures thereof.

4. The fiber-reinforced polypropylene composite resin composition according to claim 3, wherein the propylene homopolymer has a melt flow index of 10 to 25 g/10 min (230° C., 2.16 kg).

5. The fiber-reinforced polypropylene composite resin composition according to claim 3, wherein the propylene-ethylene copolymer comprises:
a first propylene-ethylene copolymer having a melt flow index of 25 to 35 g/10 min (230° C., 2.16 kg); and
a second propylene-ethylene copolymer having a melt flow index of 90 to 100 g/10 min (230° C., 2.16 kg).

6. The fiber-reinforced polypropylene composite resin composition according to claim 1, wherein the polypropylene polymer has a weight average molecular weight of 80,000 to 600,000 g/mol and a specific gravity of 0.89 to 0.91.

7. The fiber-reinforced polypropylene composite resin composition according to claim 1, wherein the thermoplastic elastomer comprises:
an olefin-based thermoplastic elastomer; and
a styrene-based thermoplastic elastomer.

8. The fiber-reinforced polypropylene composite resin composition according to claim 1, wherein the fiber-shaped filler is selected from the group consisting of glass fiber, carbon fiber, steel fiber, aramid fiber, polypropylene fiber, vinylon fiber, nylon or mixtures thereof.

9. The fiber-reinforced polypropylene composite resin composition according to claim 1, wherein the fiber-shaped filler has a diameter of 10 to 30 μm, and a length of 1 to 12 mm.

10. The fiber-reinforced polypropylene composite resin composition according to claim 1, wherein the coupling agent is a modified polypropylene polymer grafted with unsaturated carboxylic acid or a derivative thereof.

11. The fiber-reinforced polypropylene composite resin composition according to claim 1, wherein the inorganic deodorant is a silicate compound represented by Compositional Formula 1 and having a layered structure:

$$Ag_2Al_2H_8N_2O_{21}Si_7Zn_2$$ [Compositional Formula 1].

12. The fiber-reinforced polypropylene composite resin composition according to claim 1, wherein the inorganic deodorant has a BET (Brunauer Emmett Teller) surface area of 220 to 280 m²/g.

13. The fiber-reinforced polypropylene composite resin composition according to claim 2, wherein the slip agent is selected from the group consisting of a saturated fatty acid amide-based slip agent, a silicone-based slip agent or mixtures thereof.

14. The fiber-reinforced polypropylene composite resin composition according to claim 2, wherein the UV stabilizer is a mixture of: a hindered amine light stabilizer (HALS)-based UV stabilizer having a weight average molecular weight of 2,000 g/mol or more; and an antioxidant selected from a phenol-based antioxidant, an amine-based antioxidant, a sulfur-based antioxidant, a phosphorus-based antioxidant or mixtures thereof.

15. A molded article comprising the fiber-reinforced polypropylene composite resin composition of claim 1.

16. The molded article according to claim 15, wherein the molded article has an elongation of 5.0% or more, a high temperature (23° C.) IZOD impact strength of 260 J/m or more and a low temperature (−10° C.) IZOD impact strength of 180 J/m or more; and
has an odor grade measured in accordance with MS300-34, of 2.5 or less.

17. The molded article according to claim 15, wherein the molded article is a vehicle interior part.

* * * * *